United States Patent [19]
Rasmussen

[11] 3,872,374
[45] Mar. 18, 1975

[54] POWER CONTROL TIMING CIRCUITS WITH POWER LINE COMPENSATION

[75] Inventor: Clarence E. Rasmussen, Euless, Tex.

[73] Assignee: Electronic Control Corporation, Euless, Tex.

[22] Filed: July 28, 1970

[21] Appl. No.: 64,093

Related U.S. Application Data

[63] Continuation of Ser. No. 673,538, Oct. 4, 1967, abandoned.

[52] U.S. Cl. .......... 323/22 SC, 307/252 B, 315/196, 315/238, 315/275, 323/24, 323/36
[51] Int. Cl. .............................................. G05f 3/04
[58] Field of Search ......... 307/252 B, 322; 315/194, 315/196, 238, 241 R, 275, 307; 318/345; 323/4, 22 SC, 24, 36, 39

[56] References Cited
UNITED STATES PATENTS

| | | | |
|---|---|---|---|
| 3,346,874 | 10/1967 | Howell | 323/39 UX |
| 3,348,128 | 10/1967 | Storm | 323/4 |
| 3,403,315 | 9/1968 | Maynard | 323/36 UX |
| 3,423,635 | 1/1969 | Moe | 323/24 X |

Primary Examiner—A. D. Pellinen
Attorney, Agent, or Firm—Clegg, Cantrell & Crisman

[57] ABSTRACT

Line voltage compensation is provided by a power control timing circuit for gated power control devices, which utilizes a negative resistance impedance for establishing the timing capacitor charging voltage, thereby determining the conduction angle to maintain power applied to a load relatively constant, notwithstanding fluctuations in the power line voltage.

8 Claims, 7 Drawing Figures

LOW-POWER WAVE SHAPE a, e, d, f, j, i, k.
111-POWER WAVE SHAPE a, b, c, d, f, g, h, i, k.

INVENTOR:
CLARENCE E. RASMUSSEN
BY
Robert C. Peterson
ATTORNEY

POWER CONTROL TIMING CIRCUITS WITH POWER LINE COMPENSATION

This Application is a continuation of Application Ser. No. 673,538, filed Oct. 4, 1967, by Clarence E. Rasmussen, the applicant hereof, assigned to Electronic Control Corporation, now abandoned.

BACKGROUND OF THE INVENTION

1. Field of Invention

This invention relates to power control circuits for gated power control semiconductor devices and more particularly to timing circuits therefor, and more specifically, to timing circuits for gated power control semiconductor devices with compensation for fluctuations in the line voltage.

2. Description of Prior Art

Typically, in the past, power control timing circuits for power control devices which were used for controlling power consumed in motor speed and light dimmer circuits have employed strictly R-C type timing circuits, in which the line voltage supplied the charging voltage for the timing capacitor. One of the basic difficulties in such timing circuits is the fact that the charging voltage on the timing capacitor varies directly with the line voltage applied to the power circuit. Therefore, when the line voltage was higher than normal, the charging capacitor had a steep charging slope, and when the line voltage was below normal, the timing capacitor had a shallow charging slope. The normal arrangement for such a timing circuit was to have a fixed resistor, a variable resistor, and a capacitor in series, across the line, paralleling the power control switch and load circuit. This simple and inexpensive arrangement is used for light dimmer circuits. In the more expensive high-performance light dimmer circuits, an additional resistor and capacitor were placed in series across the line with the timing circuit, and the junction between the resistors and capacitors was coupled together by another resistor. This additional R-C circuit had the desired effect of maintaining a more stable charging voltage for the timing capacitor, however, the stabilizing capacitor had a positive impedance characteristic, and consequently, still varied the charging rate of the timing capacitor, in accordance with the fluctuations in the line voltage. Basically, the reason that such timing circuit problems exist is the power control devices are triggered to the on stage at a constant voltage. Consequently, the average power furnished to the load fluctuates, depending on the time required for the timing capacitor to charge to the constant voltage triggering level.

For general purpose light dimmer circuits, these particular problems are not as significant as in the case of motor speed control timing circuits.

INVENTION SUMMARY

Applicant's invention provides a power control timing circuit, utilizing a negative resistance impedance device to compensate the charging slope of the timing capacitor. The negative impedance device acts as a variable power supply providing a higher charging voltage at low line voltage than at high line voltage, thereby maintaining the partial derivative of the firing angle, Tau, (the angular time in the voltage cycle from Omega equals zero to the switching point) with respect to line voltage, equal to a negative value. Thus, even though the power control device fires at a constant voltage level of the timing capacitor, the average power applied by the power control device to the load will remain relatively constant.

It is therefore an object of the invention to provide a timing circuit for a power control device with power line compensation to maintain the average power supplied to a load relatively constant;

Another object of the invention is to provide a timing circuit for power control devices which includes a negative resistance impedance device which establishes the charging voltage of the timing capacitor;

Another object of the invention is to provide a power control timing circuit for a power control device triggered at a constant voltage by the timing capacitor, wherein the charging voltage for the timing capacitor is derived from the line voltage appearing across a negative impedance device, whereby the partial derivative of the timing constant with respect to line voltage equals a negative quantity;

Another object of the invention is to provide a power control unit including a negative impedance compensating device, which may be employed with a simple R-C timing circuit to maintain the average power supplied to a load relatively constant;

It is another object of the invention to provide a power control timing circuit including bilateral negative impedance device for a bilateral power control device wherein the charging voltage is compensated for line voltage fluctuation by the negative impedance device, such that at constant firing voltage level for the power control device, the average power to the load is maintained relatively constant.

DRAWING DESCRIPTION

PREFERRED EMBODIMENTS

Figure 1:
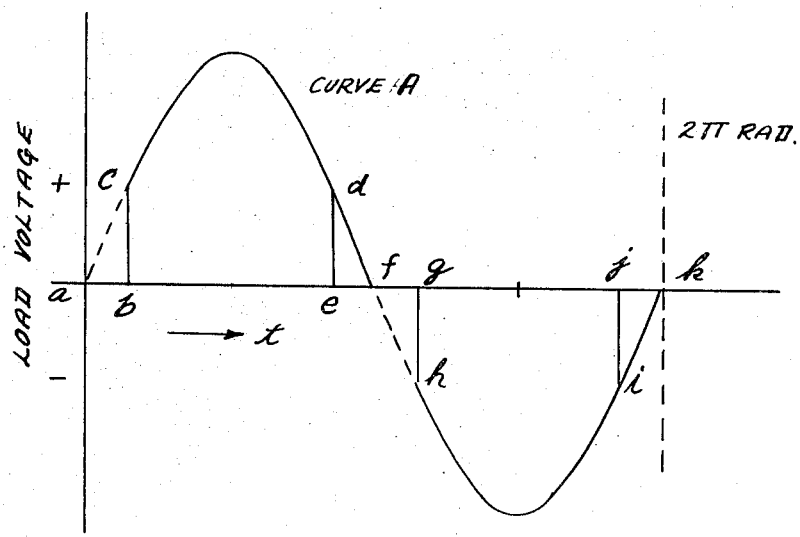
FIG. 1 illustrates a typical wave shape for power applied to the load at both low average power and high average power.
Figure 2:
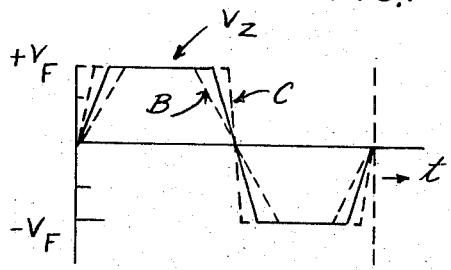
FIG. 2 illustrates the change in the charging voltage for an R-C timing circuit wherein line voltage fluctuations occur.

Referring to the drawings and in particular FIGS. 1 and 2, it is first necessary to fully understand the basic wave forms exhibited by power control devices. In FIG. 1, a full cycle of 2 pi radians of load voltage is plotted against time. If the area under sine curve A were integrated, the average voltage across the load could be determined.

For high power consuming loads controlled by a power control device, a typical load voltage wave shape is illustrated in FIG. 1 by the curve described from points a to b, b to c, c to d and d to f, for the positive half cycle of pi radians, and points f to g, g to h, h to i, and i to k, for the negative half cycle of pi radians (from pi radians to 2 pi radians). In this case, the conduction angle would be (pi − b) radians. For low power consuming load controlled by a power control device, a typical load voltage wave shape is illustrated in FIG. 1 by the curve described from points a to e, e to d, and d to f for the positive half cycle of pi radians, and points f to j, j to i, and i to k, for the negative half cycle of pi radians (from pi radians to 2 pi radians). In this case, the conduction angle would be (pi−e) radians.

The effect of fluctuation in line voltage from the designed operation of a power control device is illustrated by the curves in FIG. 2 wherein the voltage on the charging impedance for the timing capacitor is plotted against time. The values $V_F$ and $-V_F$ equal voltage on the charging impedance when the timing capacitor charges to a voltage level to switch the power control device from high to low impedance (off to on).

Figure 3:
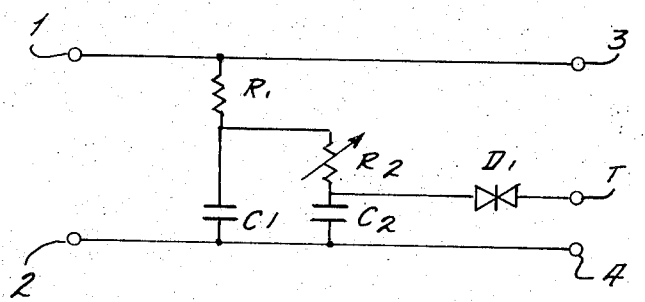
FIG. 3 illustrates a contemporary power control timing circuit.

FIG. 3 is a typical high performance timing circuit having the characteristics depicted in FIG. 2. The circuit includes an AC line voltage source at the input terminals 1 and 2. The output terminals 3 and 4 are connected across a power control switch and load circuit (not shown). The timing circuit has a trigger output T, which is connected to the gate of the power control switch (not shown). The trigger circuit itself has a charging impedance, capacitor $C_1$, that charges toward the line voltage through resistor $R_1$. Timing capacitor $C_2$ charges through the impedance of variable resistor $R_2$ (potentiometer) towards the voltage on the charging impedance, capacitor $C_1$. The voltage on timing capacitor $C_2$ is applied to bilateral trigger diode $D_1$, and when the voltage on timing capacitor $C_2$ reaches breakover voltage of diode $D_1$, which is generally a constant voltage, the trigger output T is applied to the gate of the power control switch (not shown), generally, the trigger diode $D_1$, hence, the power control switch operates at a constant value of 40 volts. Considering the characteristic depicted in FIG. 2 in conjunction with the trigger circuit illustrated in FIG. 3, if the line voltage remains constant, Curve $V_Z$ represents the voltage on the charging impedance and capacitor $C_2$ will charge to the breakover voltage of diode $D_1$ at the same value of Tau (the timing constant). Hence, with constant line voltage and constant timing constant, Tau, the average power to the load will be constant. If the line voltage is low, capacitor $C_2$ will have a shallow charging slope and require a larger charging time; hence, timing constant, Tau, will be larger, and the low line voltage will be applied to the load for a shorter time period consuming less power. Likewise, if the line voltage is high, capacitor $C_2$ will have a steep charging slope and require less charging time; hence, timing constant, Tau, will be shorter and the high line voltage will be applied to the load for a longer period consuming more power. Therefore, the average power to the load will be more or less depending on the timing constant, Tau, for a given circuit, as well as the load voltage. In a light dimmer application with the light control (potentiometer $R_2$ in FIG. 3) just above threshold value (the value below which the light will be extinguished), any low line voltage will cut off the light and any high line voltage will highly intensify the light.

Figure 4:
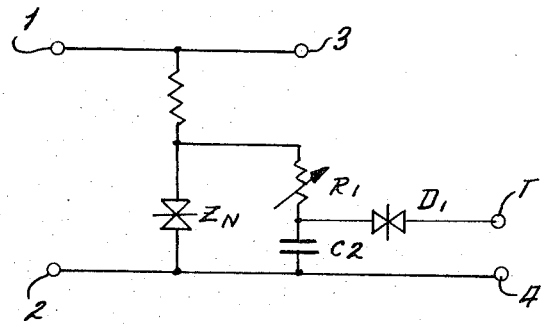
FIG. 4 illustrates the timing circuit of the invention, including a negative impedance device for compensating fluctuations in line voltage.
Figure 5:
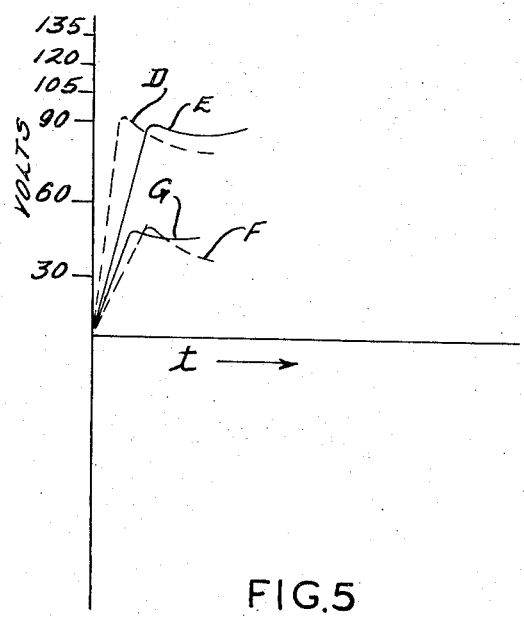
FIG. 5 illustrates the variation in switching point in relationship to the variation of AC line voltage on the negative resistance charging impedance device appertaining to the invention.
Figure 6:
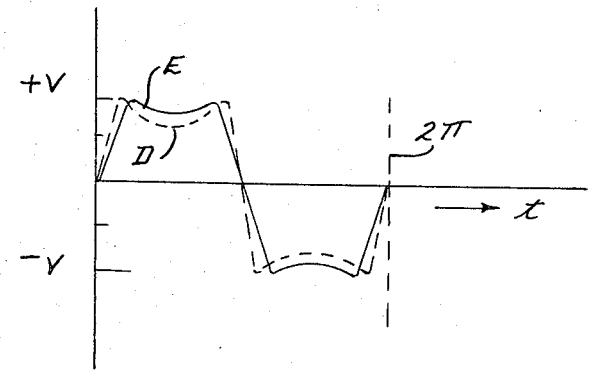
FIG. 6 illustrates the negative resistance characteristics of the negative impedance device under conditions of higher than average line voltage, and lower than average line voltage.

With the foregoing explanation of contemporary timing circuits, reference is now made to FIGS. 4, 5 and 6 for an explanation of applicant's invention. In the contemporary timing circuits, it is apparent that the partial derivative of the timing constant, Tau, with respect to line voltage is positive, inasmuch as the partial derivative of voltage on the charging impedance ($C_1$ in FIG. 3) with respect to current is positive. Applicant has discovered that the partial derivative of the timing constant, Tau, can be made negative by obtaining a negative value for the partial derivative of voltage with respect to current on the charging impedance. FIG. 4 illustrates the timing circuit of FIG. 3 with capacitor $C_1$ replaced by a negative impedance device $Z_N$. The device $Z_N$ may be any of the well known trigger diodes such as are generally employed to trigger gated power control switches which are sometimes referred to as break back trigger diodes such diodes are described in U.S. Pat. No. 3,196,329 issued to D. F. Cook as having break-back voltage after breakdown, while U.S. Pat. No. 3,348,128, issued to H. F. Storm refers to such diodes as snap switch devices. Typical voltage-current characteristics of such devices are shown in FIG. 3 of the Cook U.S. Pat. No. 3,196,329. The characteristic of typical break back trigger diodes such as device $Z_N$ is illustrated in FIG. 5, wherein the voltage characteristic of the trigger is plotted against time. The voltage characteristic of device $Z_N$ with high line voltage is depicted by Curve D, and Curve E represents low line voltage, both with negative impedance characteristics. Curves G and F depict the characteristics of trigger diode $D_1$ reacting to charging impedance $Z_N$, and will hereafter be discussed. Considering FIG. 6, the voltage characteristics of charging impedance $Z_N$ are depicted over a full cycle of 2 pi radians for Curves D and E of FIG. 5.

It will be apparent that the voltage characteristics of charging impedance capacitor $C_1$ in FIG. 2 and device $Z_N$ in FIG. 6 establish the charging time of timing capacitor $C_2$. The charging time of capacitor $C_2$ is directly proportional to the timing constant, Tau, since timing constant has been defined as the time from Omega equals zero to the conduction angle (the firing angle of trigger diode $D_1$ and the power control device). Thus, if $C_1$ charges toward a high line, $C_2$ will charge faster, decreasing Tau, and if $C_1$ charges toward a low line, $C_2$ will charge slower, increasing Tav. Hence, the partial derivative of load power with respect to line power is negative or positive but not zero.

By utilizing charging impedance device $Z_N$, having a negative partial derivative of voltage with respect to current, the partial derivative of the timing constant, Tau, with respect to the line voltage, will have a negative value. With sufficient negative partial derivative of voltage with respect to current, the partial derivative of load power with respect to line power approaches zero, hence, compensating for high or low line voltage.

Considering FIG. 5 again, Curves G and F represent the time relation of timing capacitor $C_2$ and trigger T (trigger diode D, firing angle, see FIG 4) for low line voltage and high line voltage, respectively. It will be observed that the voltage characteristic of device $Z_N$ has a greater negative slope at high line voltage (Curve D) than at low line voltage (Curve E); however, timing capacitor $C_2$ charges to the voltage to generate trigger T (trigger diode $D_1$ firing angle, see FIG. 4) faster at low line voltage (Curve G) than at high line voltage (Curve F). Consequently, the firing angle, Tau, will be less for low line voltage and greater for high line voltage producing the desired result of making the partial derivative of load power with respect to line power approach zero. Hence, the average load power is relatively constant with fluctuation of line voltage.

Figure 7:
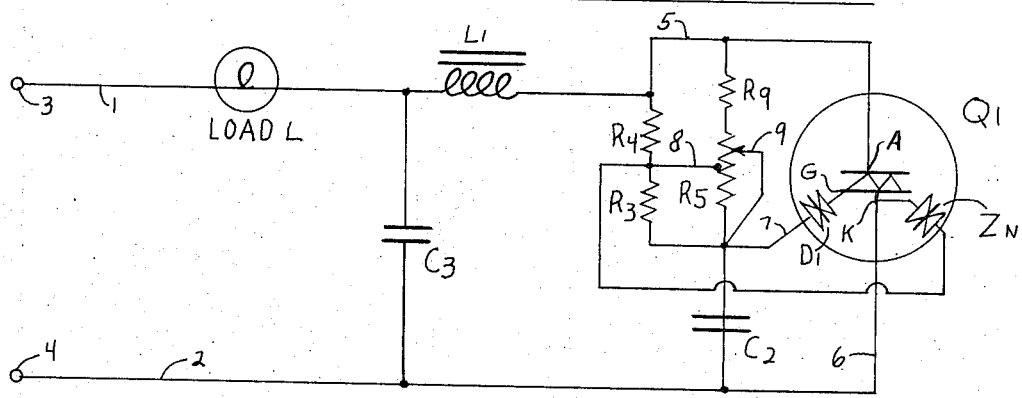
FIG. 7 illustrates the negative impedance device utilized for compensating line voltage in a light dimmer circuit.

Referring to FIG. 7, a typical light dimmer circuit employing the line compensator appertaining to the invention is illustrated. The circuit comprises lines 1 and 2 connected at terminals 3 and 4 to a source of AC line voltage or power. Line 1 is connected to one side of light load L, and the other side of the load L is connected to one side of capacitor $C_3$. The other side of capacitor $C_3$ is connected to line 2. An inductor $L_1$ is connected on one side to the juncture of load L and capacitor $C_3$. The other side of inductor $L_1$ is connected by line 5 to the anode A of power control device $Q_1$. The cathode K of device $Q_1$ is connected to the juncture of line 2 and capacitor $C_3$ by line 6. Bilateral trigger diode $D_1$ is connected to the gate G of device $Q_1$. Resistor $R_3$ and resistor $R_4$ are connected in series between line 5 and the connection 7 of trigger diode $D_1$. Resistor $R_9$ and tapped potentiometer $R_5$ are connected in series between line 5 and connection 7. Tap 8 of potentiometer $R_5$ is connected to the juncture of resistors $R_3$ and $R_4$. The juncture of resistor $R_3$, connection 7 and potentiometer $R_5$ is coupled by timing capacitor $C_2$ to line 6. The juncture of resistors $R_3$ and $R_4$ is connected to line 6 through negative impedance device $Z_N$ which is the charging impedance for timing capacitor $C_2$. Potentiometer $R_5$ has a wiper contact 9 for setting the resistance thereof.

In operation of the line compensated dimmer circuit depicted in FIG. 7, $C_3$ and $L_1$ act as a filter to eliminate noise. With positive going line voltage on line 1, line 5 will provide positive voltage rise at the juncture of line 5 and resistor $R_4$, hence, current will flow through resistor $R_4$ and charging impedance device $Z_N$ into line 6. Also, current will flow from resistor $R_4$ through current limiting resistor $R_3$ and timing capacitor $C_2$ into line 6. Likewise current will flow from line 5 through voltage limiting resistor $R_9$ and part of potentiometer $R_5$ depending on the setting of wiper arm 9. Since charging impedance device $Z_N$ is connected to the tap 8 and juncture of resistors $R_3$ and $R_4$, the circuit will slightly compensate for line voltage fluctuations when wiper arm 9 shunts the tapped portion of potentiometer $R_5$. Such a condition occurs under normally high intensity settings for the light load L and line fluctuations do not significantly effect the apparent light intensity. However, at a setting of wiper arm 9 at the juncture of Potentiometer $R_5$ and Capacitor $C_2$, charging impedance device $Z_N$ affords full compensation for ling voltage fluctuations. Such condition occurs under normally low intensity settings for the light load L where line voltage fluctuations significantly change apparent light intensity. Typical values for the circuit in FIG. 7 are:

Load — 100 to 500 watt tungsten lamp
$C_2$ — 0.047 uf, 200 V.
$C_3$ — 0.047 uf, 400 V.
$R_5$ — 100 K ohms potentiometer, tapped at 60% of CW.
$R_4$ — 47 K to 100 K ohms.
$R_3$ — 82 K to 470 K ohms.
$L_1$ — 100 uH torroidal coil
$R_9$ — 4.7 K ohms ½ watt.

$D_1$, $Z_N$ and $Q_1$ — single unit, QUADRAC power control device No. 68-01, Electronic Control Corporation, Euless, Texas.

What is claimed is:

1. In a power control circuit including a source of AC line voltage, and a load and grated power control device in series across the source of AC line voltage; a line voltage compensating timing network coupled across the source of AC line voltage comprising a charging potential network including a negative impedance device and a first resistor in series for establishing a charging potential from the source of AC line voltage and a capacitive timing network having a second resistor and timing capacitor in series shunting said negative impedance device whereby the charging potential is applied to said timing capacitor, and said timing capacitor coupled to the gate of said power control device.

2. The power control circuit of claim 1 wherein a trigger diode device couples said timing capacitor to the gate of said power control device and said negative impedance device is a bilateral breakback semiconductor diode.

3. The power control circuit of claim 1 wherein said power control device comprises a bilateral semiconductor device and said impedance device comprises a bilateral semiconductor element.

4. The power control circuit of claim 3 wherein said timing capacitor is coupled to the gate of said power control device by a bilateral semiconductor trigger diode.

5. An AC power control circuit for connection in series circuit relationship with a load across an AC line voltage source comprising a power control semiconductor device having a pair of power electrodes and a control electrode, said pair of power electrodes providing the AC power control circuit connection in series circuit relationship with the load across the AC line voltage source, and a line voltage compensating timing network coupled across the pair of power electrodes comprising a charging potential network including a negative impedance device and a first resistor in series for establishing a charging potential from the AC line voltage source and a capacitive timing network having a second resistor and timing capacitor in series connected in shunt across the negative impedance device whereby the charging potential is coupled to said timing capacitor, said timing capacitor output being coupled to the control electrode.

6. A power control circuit for the maintenance of relatively constant load power irrespective of line voltage variations about a normal value including a source of AC line voltage, a load and a gated semiconductor power control device in series across the source of AC line voltage, a charging potential network having a first resistor and a negative impedance device in series coupled across said source of AC line voltage, and a capacitive timing network having a second resistor and timing capacitor in series shunting said negative impedance device, the output of said timing capacitor network coupled to the gate of said power control device.

7. The power control circuit of claim 6 wherein said power control device is a bilateral semiconductor device, said negative impedance device comprises a bilateral semiconductor element and said timing capacitor being coupled to said gate of said power control device by a bilateral semiconductor trigger diode.

8. An AC power control circuit for connection in series circuit relationship with a load across an AC line voltage source comprising a power control semiconductor device having a pair of power electrodes and a control electrode, said pair of power electrodes providing the AC power control circuit connection in series circuit relationship with the load across the AC line voltage source, and a line voltage compensating timing network coupled across the series circuit of the pair of power electrodes and the load comprising a charging potential network including a negative impedance device and a first resistor in series for establishing a charging potential from the AC line voltage source and a capacitive timing network having a second resistor and timing capacitor in series connected in shunt across the negative impedance device whereby the charging potential is coupled to said timing capacitor, said timing capacitor output being coupled to the control electrode.

* * * * *